(12) United States Patent
Pollock et al.

(10) Patent No.: US 12,374,949 B2
(45) Date of Patent: Jul. 29, 2025

(54) COIL STRUCTURES

(71) Applicant: Technelec Ltd, Oakham (GB)

(72) Inventors: Richard Pollock, Oakham (GB); James Nicholls, Oakham (GB); Peter Dackus, Oakham (GB); Abigail Cumming, Oakham (GB)

(73) Assignee: Technelec Ltd, Oakham (GB)

( * ) Notice: Subject to any disclaimer, the term of this patent is extended or adjusted under 35 U.S.C. 154(b) by 337 days.

(21) Appl. No.: 17/731,444

(22) Filed: Apr. 28, 2022

(65) Prior Publication Data

US 2022/0352775 A1 Nov. 3, 2022

(30) Foreign Application Priority Data

Apr. 29, 2021 (GB) ..................... 2106110

(51) Int. Cl.
| | |
|---|---|
| *H02K 3/26* | (2006.01) |
| *B33Y 80/00* | (2015.01) |
| *H02K 3/28* | (2006.01) |
| *H02K 15/04* | (2025.01) |
| *H02K 15/0407* | (2025.01) |

(52) U.S. Cl.
CPC ............... *H02K 3/26* (2013.01); *B33Y 80/00* (2014.12); *H02K 3/28* (2013.01); *H02K 15/0407* (2013.01)

(58) Field of Classification Search
CPC .. H02K 3/04; H02K 3/14; H02K 3/48; H02K 3/28; H02K 3/26; H02K 15/0407; B33Y 80/00
USPC ......................................................... 310/208
See application file for complete search history.

(56) References Cited

U.S. PATENT DOCUMENTS

| | | | | |
|---|---|---|---|---|
| 4,247,978 A | * | 2/1981 | Smith ................... | H02K 15/10 |
| | | | | 493/405 |
| 7,268,456 B2 | * | 9/2007 | Harada ................... | H02K 3/12 |
| | | | | 310/201 |
| 7,343,662 B2 | * | 3/2008 | Gorohata ........... | H02K 15/0428 |
| | | | | 29/598 |
| 10,468,931 B2 | * | 11/2019 | Padilla ...................... | F16B 2/12 |
| 10,855,128 B2 | | 12/2020 | Lange et al. | |

(Continued)

FOREIGN PATENT DOCUMENTS

| | | |
|---|---|---|
| EP | 0727867 A1 | 8/1996 |
| EP | 2688183 A2 | 1/2014 |

(Continued)

OTHER PUBLICATIONS

European Search Report for European Application No. 2106110.6 dated Oct. 8, 2021.

(Continued)

*Primary Examiner* — Alex W Mok
(74) *Attorney, Agent, or Firm* — Harness, Dickey & Pierce, P.L.C.

(57) ABSTRACT

A coil structure for an electromagnetic device comprising a conductor configured to provide a coil comprising one or more coil turns around a magnetic core to induce a magnetic flux in the magnetic core when in use. The conductor comprises one or more a first parts comprising a plurality of sub-conductors in parallel, and one or more second parts coupled in series with the first part(s), wherein the or each second part comprises a single sub-conductor or a lesser number of sub-conductors in parallel.

17 Claims, 9 Drawing Sheets

(56) References Cited

U.S. PATENT DOCUMENTS

| | | | |
|---|---|---|---|
| 10,903,729 B1* | 1/2021 | Cunnyngham | H02K 17/16 |
| 2012/0212088 A1 | 8/2012 | Schlote | |
| 2015/0076951 A1* | 3/2015 | Lynch | H02K 15/024 |
| | | | 310/195 |
| 2016/0013693 A1 | 1/2016 | Tangudu et al. | |
| 2018/0149001 A1 | 5/2018 | Kleppa et al. | |
| 2018/0159396 A1* | 6/2018 | Padilla | F16M 13/02 |
| 2018/0205298 A1 | 7/2018 | Huang et al. | |
| 2018/0205299 A1 | 7/2018 | Huang et al. | |
| 2018/0367005 A1 | 12/2018 | Rahman et al. | |
| 2021/0013784 A1 | 1/2021 | Shirazee | |

FOREIGN PATENT DOCUMENTS

| | | | |
|---|---|---|---|
| EP | 2913908 | A2 | 9/2015 |
| EP | 3043449 | A2 | 7/2016 |
| EP | 3327903 | A1 | 5/2018 |

OTHER PUBLICATIONS

Extended European Search Report dated Dec. 2, 2022 issued in related European patent application No. 22170651.8.
European Office Action dated Jan. 28, 2025 issued in corresponding European Appln. No. 22170651.8.

\* cited by examiner

COIL STRUCTURES

CROSS-REFERENCE TO RELATED APPLICATIONS

A claim for priority under 35 U.S.C. § 119 is made to Great Britain Patent Application No. GB2106110.6 filed on Apr. 29, 2021, the entire contents of each of which are hereby incorporated by reference.

TECHNICAL FIELD

The present invention relates to coil structures, such as the stator windings of an electrical motor.

BACKGROUND

A typical synchronous motor comprises a stationary stator with coil windings magnetically coupled to and surrounding a rotor. Typically, the motor is powered by a three-phase alternating current that synchronously switches the polarity of the electromagnets in the stator to create torque.

In high-AC frequency electromagnetic machines, high-AC frequencies create losses in electrical windings that are orders of magnitude higher than the losses in the same windings when operating with DC current or low frequency current. It is customary for such electromagnetic machines and inductor windings to be wound with Litz wire. Litz wire is a bundle of smaller conductors with strands of thinner wire, each insulated from one another and twisted in a way to minimise the increase in resistance due to increasing frequency. Since the multiple conductors or strands of wire have a lower overall copper area compared to a solid conductor of the same outside diameter, the DC resistance of Litz wire is higher than the equivalent sized single conductor. As the frequency increases however, the resistance of Litz wire does not increase so rapidly due to the reduced AC effects. At electrical frequencies above a few kHz, a Litz wire will provide a more efficient conductor.

SUMMARY

According to a first aspect of the present disclosure there is provided a coil structure for an electromagnetic device comprising a conductor configured to provide a coil comprising one or more coil turns around a magnetic core to induce a magnetic flux in the magnetic core when in use. The conductor comprises one or more first parts comprising a plurality of sub-conductors in parallel, and one or more second parts coupled in series with the first part(s), wherein the or each second part comprises a single sub-conductor or a lesser number of sub-conductors in parallel. Hence, the conductor can change from being a Litz-wire with multiple sub-conductors in one part of the coil to a single sub-conductor in another part. This change between the number of sub-conductors can be configured to occur even in a single turn of the coil to improve performance. That is, each coil turn may comprise a first part of the one or more first parts and a second part of the one or more second parts.

The coil structure may be arranged for a stator of an electric motor having a rotor configured to rotate about an axis. At least one coil turn may comprise a first part of the one or more first parts and a second part of the one or more second parts, wherein a transition between the first and second parts occurs substantially at both axially outer ends of the magnetic core. Typically, a first part is arranged axially along the magnetic core of the stator and transitions into a second part (e.g. single sub-conductor) as it exits the slot at either end of the magnetic core. Hence, in this embodiment the first part of the conductor is located in the active region of the stator, while the second part of the conductor, constituting the end winding of the coil, is located outside the active region.

The plurality of sub-conductors of the or each first part may comprise a number of sub-conductors in the range of 2 to 10. Surprisingly, it has been found that a relatively small number of sub-conductors in parallel provides good results.

Preferably, the sub-conductors of the or each first part are twisted around one another (e.g. they have a helical shape). Typically, the sub-conductors are twisted around an axis (an imaginary line) perpendicular to a cross-sectional profile of the conductor. The axis is typically located between a central point of the cross-sectional profile and an outer edge of the cross-sectional profile and may be centred or off-centre. The plurality of sub-conductors of the or each first part are preferably twisted to provide one or more full rotations of each sub-conductor. This allows each sub-conductor to have a substantially equal exposure to the magnetic field. Embodiments may also have close to an integer number of turns. For example, each sub-conductor may comprise between 90% and 100% of one whole turn, or one or more whole turns and up to 10% of an additional turn. The sub-conductors of the or each first part may be braided together.

The conductor may be configured to couple the first and second parts by means of a single sub-conductor. The coil structure may comprise a plurality of said conductors to provide a corresponding plurality of coils (e.g. one for each stator slot of an electric motor).

According to a second aspect of the disclosure, there is provided an electromagnetic device comprising a coil structure according to the first aspect. The electromagnetic device comprises first and second magnetic cores with an airgap between the magnetic cores (for example the stator core and rotor core of an electric motor). For the or each coil, the or each coil turn is arranged around the first magnetic core so that the or each first part of the conductor is located closer to the airgap than the or each second part of the conductor.

Advantageously, for the or each coil, the conductor can be arranged so that the or each first part of the conductor experiences a greater magnetic field than the or each second part when the electromagnetic device is in use.

The electromagnetic device may be an electric motor having a stator comprising said first magnetic core and said coil structure, and a rotor comprising said second magnetic core. The plurality of coils are configured to provide a plurality of phase windings of the electric motor. For example, the coils can be connected in series and/or in parallel with the other coils so as to provide three phase windings. Each coil turn may comprise a first part and a second part, wherein the first part is located in a slot of the stator adjacent to the airgap and the second part provides a return path outside the slot (e.g. to provide a toroidal coil structure). Alternatively, the coil can be wound around a stator tooth, so that the first parts of the conductor are located adjacent to the airgap in two adjacent stator slots, and the second parts are located in the same two stator slots but further back away from the airgap and/or located at the top and bottom (end windings) between stator slots, where the AC effect may be lower. The first parts in adjacent stator slots may then be connected by means of a single sub-conductor (i.e. non-Litz wire on the top and bottom going between the two stator slots).

According to a third aspect of the disclosure there is provided a method of forming a coil structure for an electromagnetic device and comprising one or more coils. The method comprises forming a substantially U-shaped part, forming a top part, and fixing the top part to the substantially U-shaped part to provide, for the or each coil, a continuous conductor providing one or more coil turns. When the parts are fixed together, the coil turns are completed. The method may be used to form a coil structure according to the first aspect.

Said step of forming the substantially U-shaped part may comprise forming the U-shaped part, and optionally the top part, by additive manufacturing. For example, both the U-shaped part and the flat top part may be separately 3D printed and then fixed together. Alternatively, said step of forming the substantially U-shaped conductor part, and optionally the top part, may comprise casting the part or parts. For example, a mould may be formed by additive manufacturing. The step of fixing the parts together may comprise bonding, welding or soldering.

The method may further comprise inserting a magnetic core (e.g. a stator core) in the substantially U-shaped part prior to fixing the top part.

According to a fourth aspect of the disclosure, there is provided a method of forming a coil structure according to the first aspect. The method comprises forming the or each conductor by additive manufacturing, and forming an insulating structure between parts of the or each conductor and its sub-conductors, wherein the insulating structure provides support for the or each conductor during the additive manufacturing. For example, the conductor and the insulating structure can be formed by a two material 3D printing process. The method may further comprise inserting the magnetic core into the coil structure during the formation of the conductor(s).

According to a fifth aspect of the disclosure there is provided a computer readable storage medium storing a design file representing the geometrical arrangement or shape of the coil structure according to the first aspect.

According to a sixth aspect of the disclosure there is provided a computer program comprising computer executable instructions that, when executed by a processor, cause the processor to control an additive manufacturing apparatus to manufacture the coil structure of the first aspect.

According to a seventh aspect of the disclosure there is provided a method of manufacturing a device via additive manufacturing. The method comprises obtaining an electronic file representing a geometry of a coil structure according the first aspect, and controlling an additive manufacturing apparatus to manufacture, over one or more additive manufacturing steps, the coil structure according to the geometry specified in the electronic file.

DETAILED DESCRIPTION

Figure 1A:
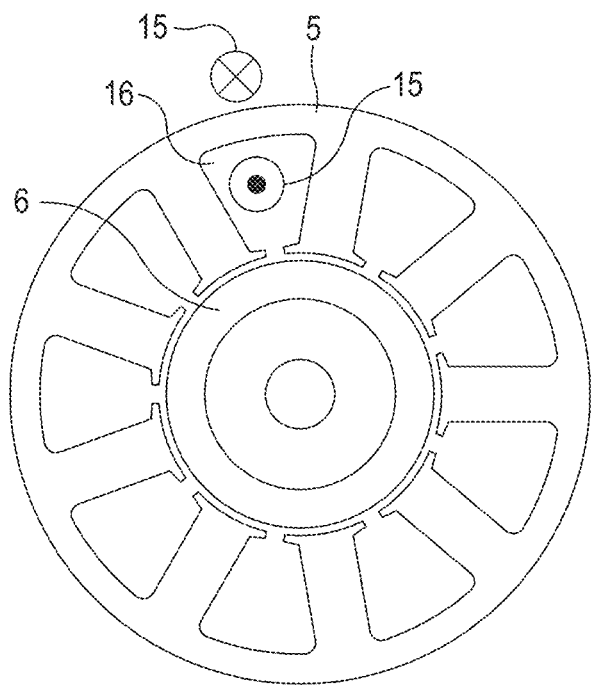
FIG. 1a shows a schematic diagram of a synchronous electric motor.

FIG. 1a shows a schematic diagram of a synchronous electric motor comprising a stator core 5 around a rotor core 6. The stator comprises 9 teeth with stator slots 16 in-between. A coil 15 (only shown for one slot 16) is arranged around the core (running from inside the slot 16 to the outside) in order to induce a magnetic flux in the cores 5 and 6 to drive the motor. The arrangement of the coil 15 is referred to as a toroidal winding. The cross and dot shown on the coil 15 illustrate how the current flows in a direction out of the page in the stator slot 16 and back into the page outside the stator at a particular time when in use.

Figure 1B:
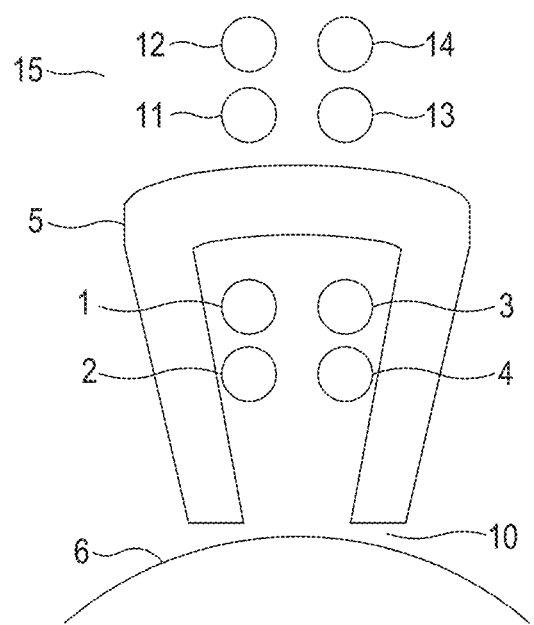
FIG. 1b shows a magnetic circuit linked with a coil.

FIG. 1b shows a schematic cross sectional view of a part of the electric motor of FIG. 1a with magnetic cores 5 and 6 being the stator core 5 and rotor core 6. A single stator slot 16 with the coil 15 with coil turns around the core 5 is illustrated. An airgap 10 exists between the magnetic cores 5 and 6, which allows the rotor to move relative to the stator.

The coil 15 has four coil turns around the stator core 5 with conductor parts 1,2,3,4 (being parts of one continuous conductor) passing through the inside of the stator slot and conductor parts 11,12,13,14 providing a return path for the current outside stator slot. That is, conductor parts 1 and 11 are part of the same turn of the coil 15, and conductor parts 2 and 12 are part of another coil turn etc. as the coil 15 goes around the core 5.

Figure 2A:
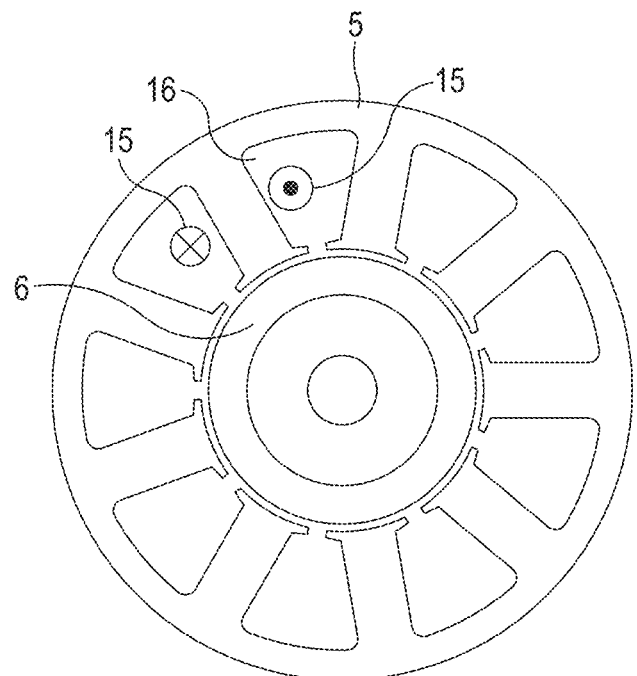
FIG. 2a shows a schematic diagram of another asynchronous electric motor.

FIG. 2a shows a schematic diagram of a synchronous electric motor according to another embodiment wherein the coil 15 is arranged around the stator teeth, going from one slot 16 to another, instead of having a return path outside the stator. The same reference numerals are used for equivalent or similar features in different figures to aid understanding, and are not intended to limit the illustrated embodiments.

Figure 2B:
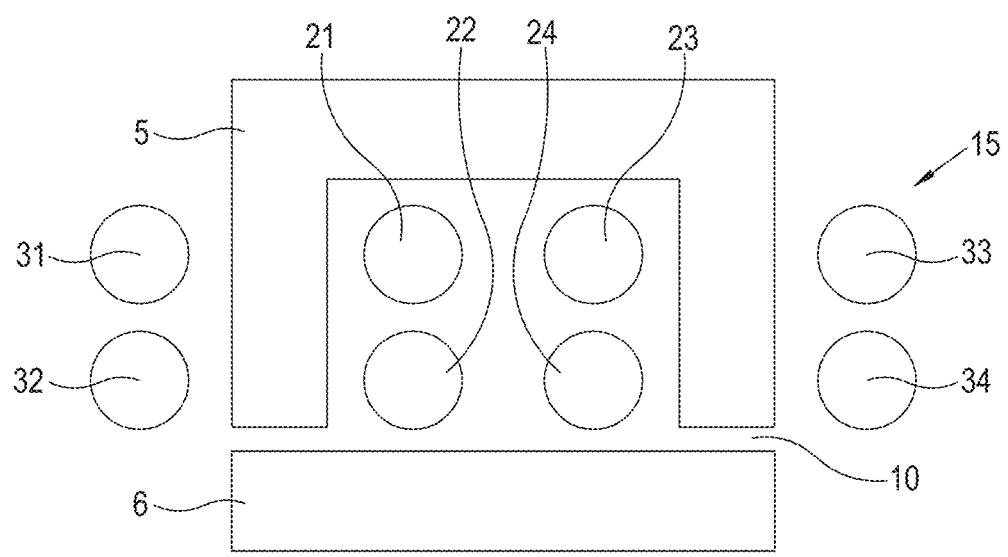
FIG. 2b shows a magnetic circuit linked with an alternative coil position.

FIG. 2b shows schematic cross sectional view of a part of the synchronous electric motor of FIG. 2a, showing core sections 5 and 6 with an airgap 10 in-between. The four conductor parts 21,22,23,24 are in a similar position to the conductor parts 1,2,3,4 in FIG. 1b. The return conductor parts 31,32,33,34 in this configuration are located on the outside of the magnetic core 5 nearer to the airgap 10.

Figure 2C:
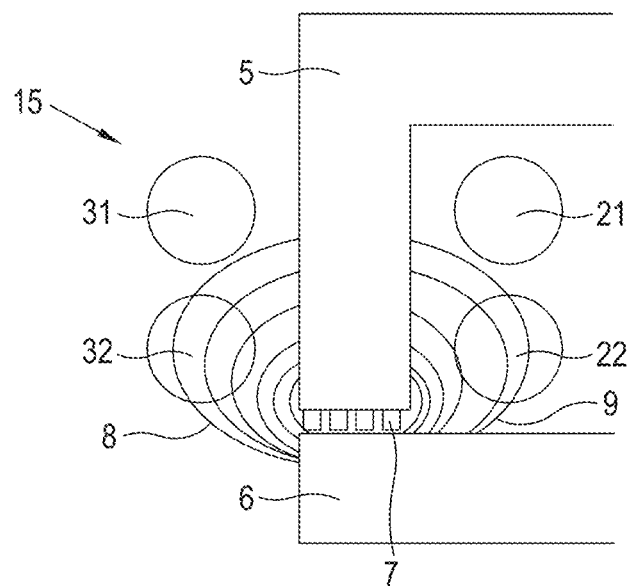
FIG. 2c shows the magnetic flux paths in the magnetic circuit of FIG. 2b.

FIG. 2c shows a part of a magnetic circuit such as the magnetic circuit of the motor of FIGS. 2a and 2b. When a current flows in conductor parts 21 and 22 and returns in conductor parts 31 and 32, a magnetic field is created in the airgap 10. The magnetic field is visualised with lines of equipotential—sometimes referred to as flux lines. In the central section 7 of the airgap 10 these lines are parallel. At the edges of the airgap 10 the flux lines are further apart due to so called fringing. The fringing magnetic fields 8 and 9 can pass through the conductor parts 22 and 32 nearest to the airgap 10.

If the conductor parts 21, 22, 31 and 32 forming the coil 15 are fed with alternating current, an alternating magnetic field exists in the area around the airgap 10 where fringing flux 8 passes through the conductors. This causes the path of the electrons in the conductor part 32 to be pushed away from the airgap 10 towards the upper surface of the conductor part 32. As a result the current density inside the conductor part 32 is unevenly distributed. The portion of the conductor part 32 near to airgap 10 has a lower current density than the portion of the conductor part 32 further from the airgap 10. A similar effect occurs in the conductor part 22 due to fringing fields 9.

As the frequency of the alternating current increases, this distortion effect increases and utilisation of the copper area of conductor parts 22 and 32 decreases. An increase in conductor resistance occurs and conductor losses increase concurrently. A similar effect occurs in the other conductor parts, such as 21 and 31, but as there is less fringing flux at these parts further away from the airgap, the increase in losses is less significant.

Figure 3:
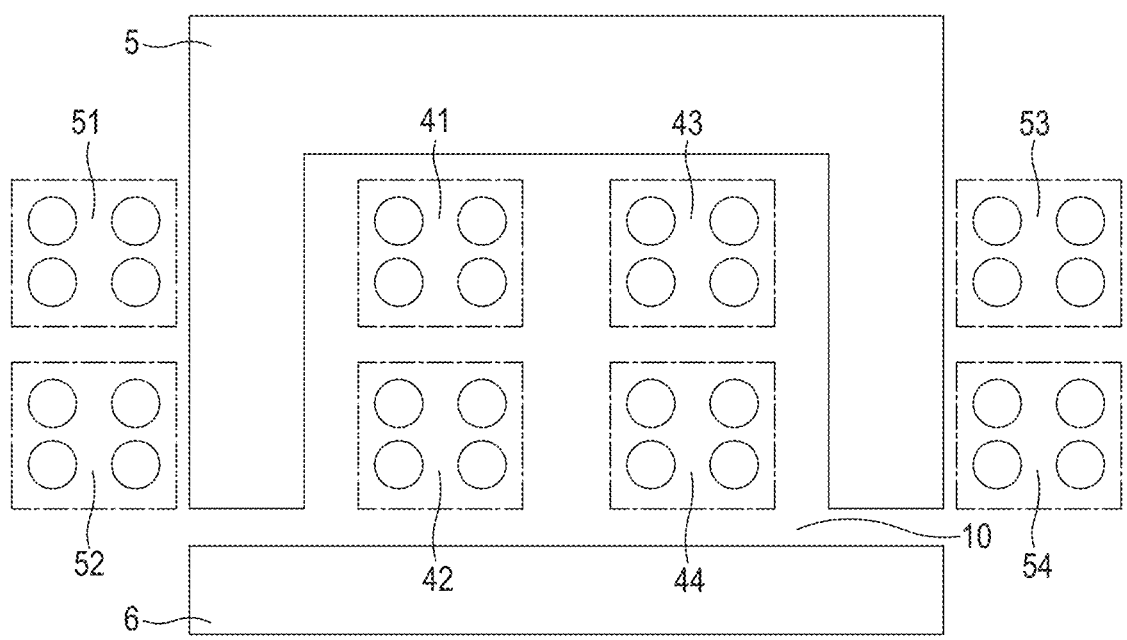
FIG. 3 shows a magnetic circuit linked by a coil arrangement with litz wire.

Litz wire is commonly used to reduce the undesirable effects aforementioned such as the high frequency alternating current associated losses. Litz wire is comprised of a plurality of strands and is illustrated by FIG. 3 whereby each of the conductor parts 41,42,43,44 and 51,52,53,54 represent four strand litz wire. In practice, the number of strands of wire in a litz conductor are in the 101 to 102 order of magnitude.

As the Litz wire passes further through the magnetic circuit, the strands of wire are twisted so that their position within the overall conductor is changed. Litz wire can provide a more even distribution of current carrying electrons across the whole cross-sectional area of the conductor. This increase in distribution reduces the alternating current losses. However, the use of multiple strands insulated from each other, and the requirement for twisting, reduces the amount of copper in the conductor cross-sectional area therefore the resistance of twisted conductors to non-alternating (DC) current or lower frequency (e.g. <100 Hz) currents may be higher than solid conductors. Furthermore, there are conductors in other parts of the magnetic circuit where there is less fringing flux and the use of Litz wire in said conductors results in an increase in losses.

For example, in FIG. 1b, the return part of conductor part 2 is conductor part 12. Whilst conductor part 2 will suffer from a fringing flux induced resistance increase, conductor part 12 experiences greatly reduced fringing flux. It is therefore very difficult to optimize the selection of a single conductor profile to suit both the conductor parts inside and those outside a magnetic circuit.

Not all parts of the electrical winding require Litz wire and the performance of the winding is reduced in some areas where the AC effects due to skin effect and proximity effect are smaller. In other areas of the winding the Litz wire provides a performance improvement. Embodiments described here provide a coil structure with a conductor that changes from a single sub-conductor to multiple sub-conductors (like a Litz wire). Alternatively, the coil structure may have one part with a greater number of sub-conductor and another part with fewer sub-conductors. This solution can provide the coil structure with a significant performance benefit not afforded by a conventional wire coil winding.

Across a coil structure, losses may not be evenly distributed over a turn, and even at high frequencies only certain parts of the turn experience the highest AC losses. The features of the coil structure disclosed herein can enable it to make the best possible utilization of the material in the conductor, by having a greater plurality of sub conductors strands in sections with the greatest AC losses and fewer sub conductors (or a single sub-conductor) in sections with dominant DC losses.

Embodiments may be particularly useful for high speed electric motors, such as motors operating above 100,000 or 200,000 rpm and/or with an AC frequency greater than 1 kHz. Embodiments may, for example, be advantageously used in turbo chargers.

Figure 4:
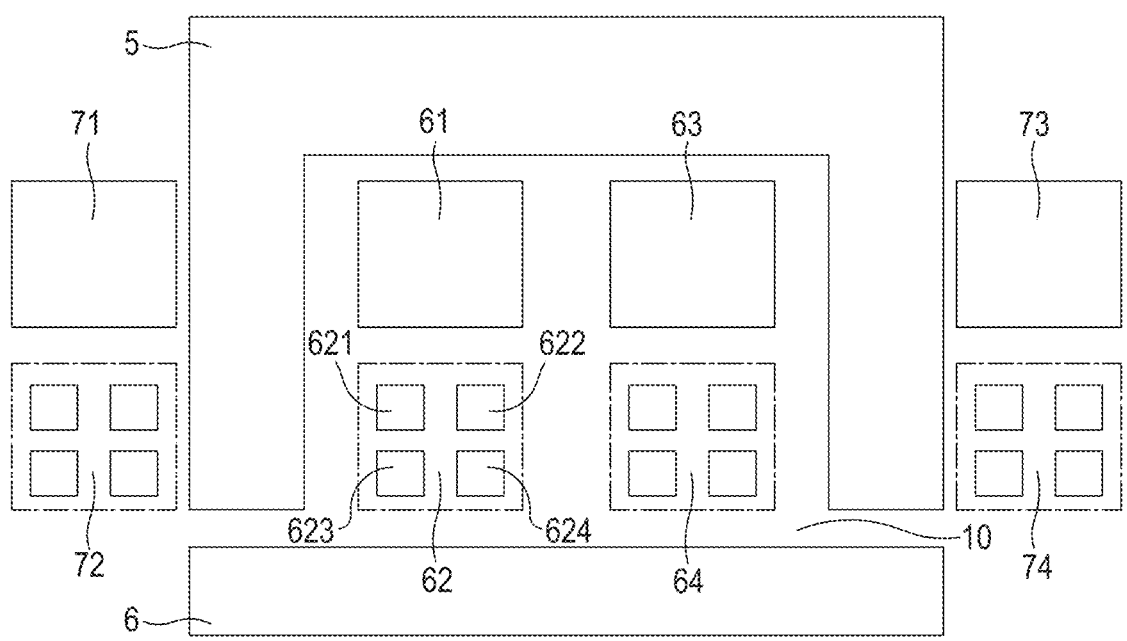
FIG. 4 shows an improved coil arrangement with different conductor profiles.

FIG. 4 shows a magnetic circuit comprising a coil 15 according to an embodiment. The conductor part 62 and return conductor part 72, near to the airgap 10 and associated fringing field, are split into smaller conductors (i.e. each of the conductor parts comprises a plurality of sub-conductors). However, conductor parts 61 and 71 further away from the airgap 10 use a solid conductor with no reduction in viable area available for copper. The cross-sectional profile of the conductor can hence be chosen to both optimize the use of available area and to minimize the effect of alternating currents and fringing fluxes.

The conductor part 62 is seen to have a finite number of sub-conductors 621, 622, 623 and 624. Contrary to known Litz wire design guidelines, the number of sub-conductors can be much less than used in Litz wire. Surprisingly, it has been found that good performance can be achieved with fewer than 10 sub-conductors making up the cross-sectional profile of the conductor.

Furthermore, in electromagnetic assemblies according to this disclosure there can be a portion of the conductor in the path of the current whereby the sub-conductors are merged to a single conductor or to a different number of sub-conductors. This change in the profile of the conductor can occur to optimize the use of the conductor area within the profile to minimize the DC resistance throughout the whole conductor path and to minimize the effects of AC resistance changes due to skin effect or proximity effect, dependent on the position of the conductor part within the magnetic assembly. This allows the optimum use of copper and minimization of copper losses throughout the electrical winding.

The cross-sectional profile of conductor is changed to make the best possible utilization of the material in the conductor. Depending on the location of the conductor part relative to the magnetic circuit, it can be a single conductor with a solid or hollow profile, or can comprise of multiple sub-conductors.

Figure 5:
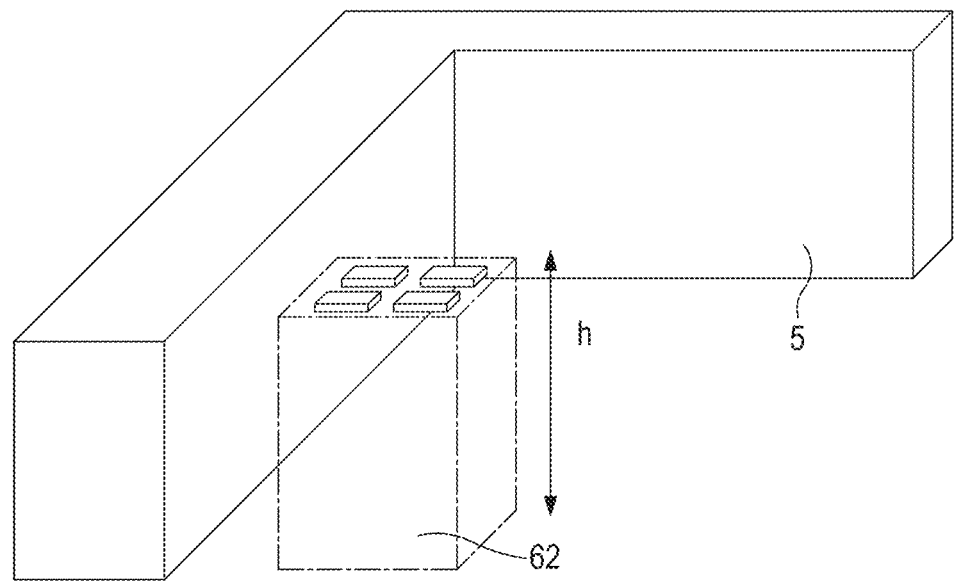
FIG. 5 shows a 3D view of the coil and magnetic circuit.

FIG. 5 shows a three-dimensional view of a part of a coil structure according to this disclosure. For example, it may be a part of the coil structure of FIG. 4. The coil structure has a height h. That is, the front part of the conductor 62, which passes through the stator slot close to the airgap has a height h. The front part of the conductor 62 comprises four sub-conductors in parallel. Preferably, the sub-conductors are twisted around a vertical axis (along the longitudinal direction of that part of the conductor). A benefit of twisting the sub-conductors within the cross-sectional profile of the conductor 62 was discovered. Said benefit is maximized if the rotation of the conductor position around an axis—parallel to the direction of current flow—results in an integer number of rotations over height h of the magnetic circuit.

This ensures that each sub-conductor has an equalized effect of being close to, or furthest from, the fringing fields near the air gap.

In a further embodiment, the integer number of rotations of the sub-conductors around the axis parallel to the direction of the current flow may occur over a length of N*h where N is the number of slots through which the same conductor passes. In this way the integer number of rotations of the sub-conductors ensures that each one of the sub-conductors passes through an equal amount of fringing flux. The result of this should be that the resistance of each individual sub-conductor is approximately equal over the length of the conductor. In an actual electromagnetic winding it may not be possible to have exactly an integer number of rotations of the sub-conductors. A non-integer number can still provide an improved distribution of the current density and lower resistance compared to a solid conductor.

As twisting of the sub-conductors tends to reduce the percentage of the area available to conduct, it has been found that the integer number of twists as the conductor proceeds through the height (h) of N slots can be as low as one or can be one in each of the N slots.

In FIG. 1b, the return conductors 11,12,13,14 are further from the airgap. They will not suffer as much from the effects of the fringing flux. Therefore there is little or no advantage in splitting these conductors 11,12,13,14 into sub-conductors. Hence, in an embodiment, only in sections of the electromagnetic device where the resistance would otherwise be increased due to the fringing fluxes passing through the conductor is the conductor split into sub-conductors and the sub-conductors twisted around each other (i.e. rotating of the position of the sub-conductors around an axis parallel to the direction of flow of current only occurs in sections of the electromagnetic device where the resistance would otherwise be increased due to the fringing fluxes passing through the conductor). For example, in the embodiment of FIG. 1b, only conductor parts 2 and 4 closest to the airgap may benefit from comprising sub-conductors and being twisted. In contrast, regarding conductor parts 1,3,11,12,13 and 14, a lower resistance may result with a solid structure due to the relatively greater volume of conducting material.

Figure 6:
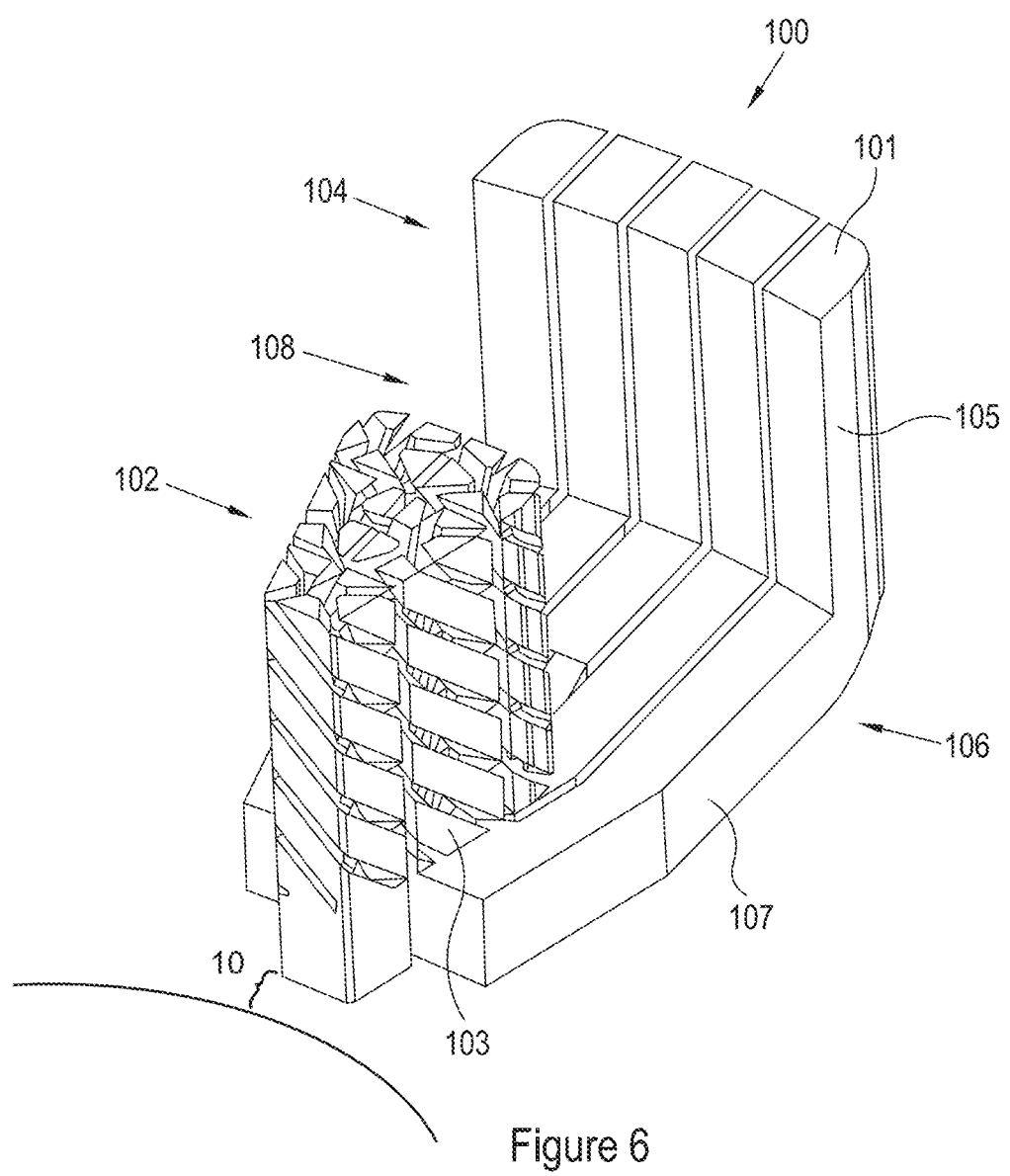
FIG. 6 shows a 3-D view of twisting sub-conductors arranged in one slot of a multipole electric motor winding, wherein the outer conductors are solid.
Figure 8A:
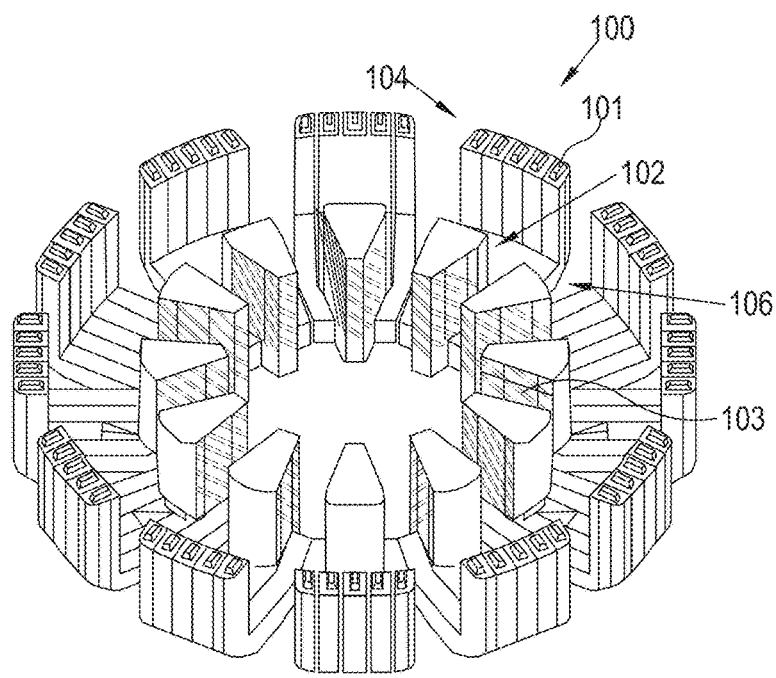
FIG. 8a shows the winding of an electric motor with inner and outer conductors and end winding conductors.
Figure 8B:
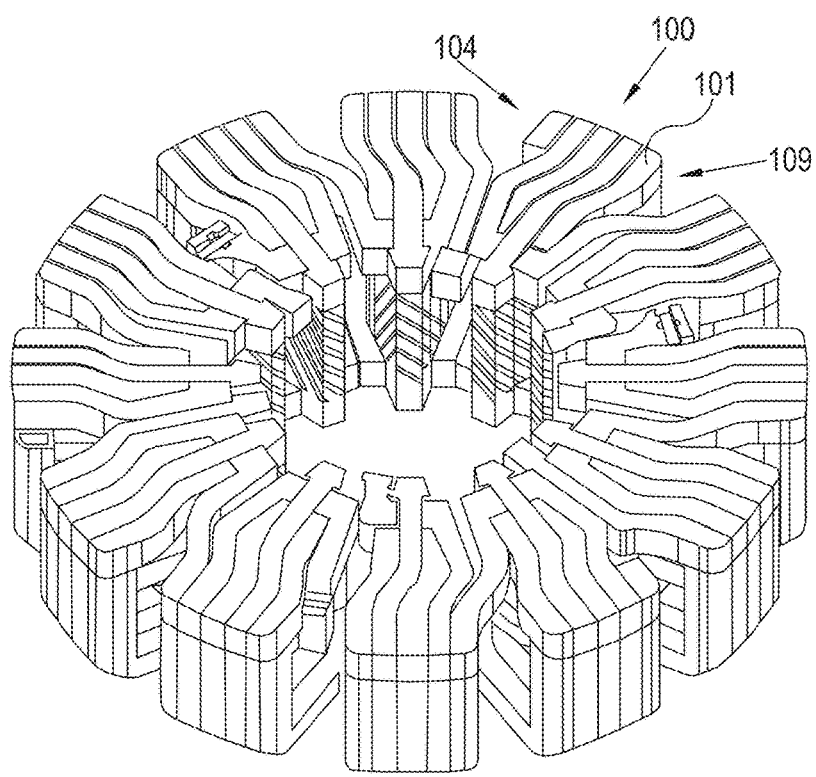
FIG. 8b shows the winding of an electric motor with inner and outer conductors and end winding conductors including the top part of the conductor.

FIG. 6 illustrates an example of a part of a coil structure 100 for a motor according to an embodiment. FIGS. 8a and 8b below show how this part is integrated into the whole coil structure 100. The coil structure 100 may be used to provide the coil 15 illustrated in FIGS. 1a and 1b. The coil structure 100 comprises a conductor 101 providing a coil having five turns (in one stator slot). The front part 102, constituting a first part, of each turn of the conductor 101 (also referred to as the "inner part"), to be located inside the slot of the motor near to the airgap 10 between the stator and rotor, is made up of four twisted sub-conductors 103 in parallel. Each twisted sub-conductor 103 is insulated from the other sub-conductors 103, for example by a varnish coating. The back part 104, constituting a second part, of each turn of the conductor 101 (also referred to as the "outer part") that comprises the return path is a (relatively) long distance from the airgap 10 of the motor and comprises (only) a single sub-conductor 105 (i.e. a single solid conductor part). The top part of the conductor 101, which closes the turns and connects the front part 102 to the back part 104 is not shown. Due to the distance from the airgap 10 and the associated fringing fields, having a single sub-conductor 105 may only cause a small increase in resistance as the frequency increases. The bottom part 106 of the conductor 101 also comprises a single sub-conductor 107 (i.e. a single solid conductor part). The conductor 101 forms a U-shape, with a gap/space 108 for locating the stator core (e.g. a laminated soft iron core) inside the coil structure 100, after which the top part (not shown) of the conductor 101 can be fixed to the front 102 and back 104 parts to close the structure 100 so that the conductor 101 "winds" around the magnetic core and is arranged to provide a magnetic flux in the magnetic core.

Figure 7:
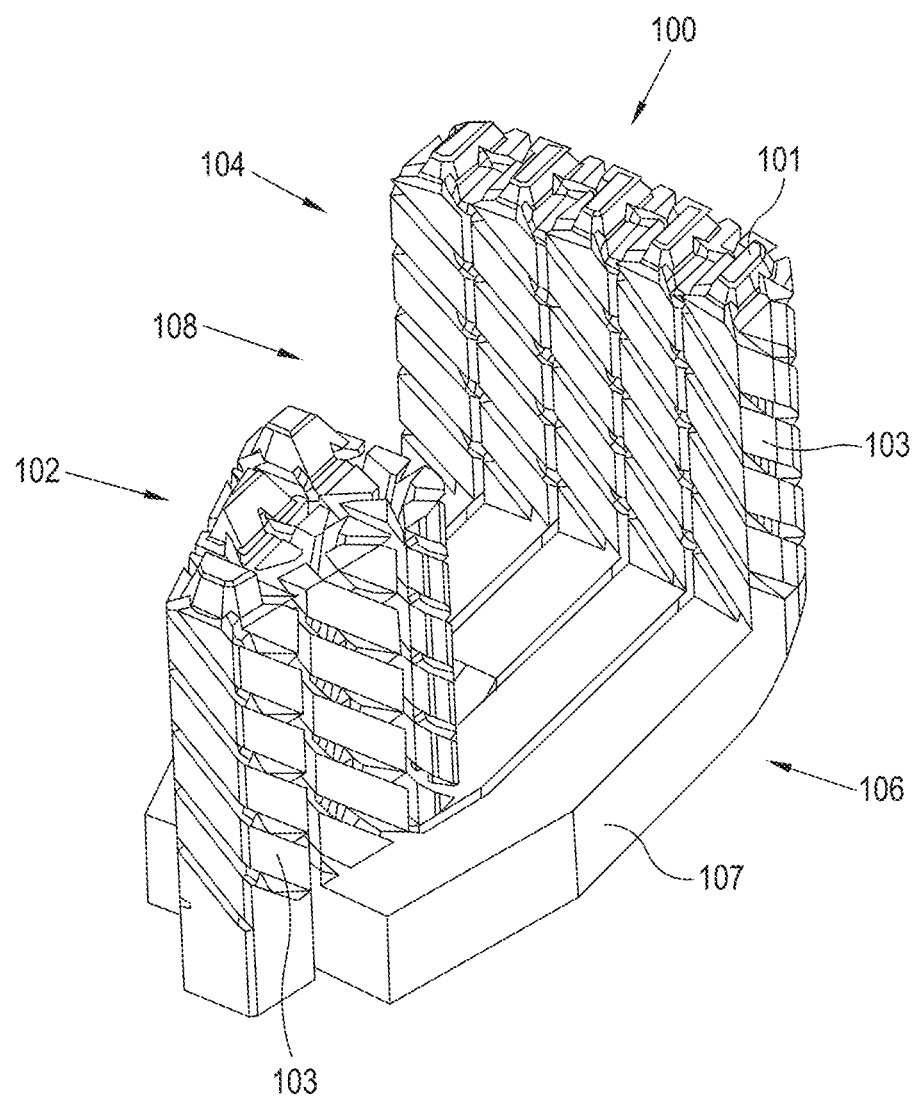
FIG. 7 shows a 3-D view of twisting sub-conductors arranged in one slot of a multipole electric motor winding, wherein the outer conductors are also twisted.

FIG. 7 shows a further implementation of a coil structure 100, which may form one coil in an electric motor. The coil structure 100 is similar to the embodiment illustrated in FIG. 6, but differs in that both the inner 102 and outer 104 conductor parts are made up of a plurality of twisted sub-conductors 103. The shape of the outside profile of the conductor is different in each part of the conductor to optimize the use of available area within the shape of the electrical machine. This embodiment can be particularly useful when there is a significant AC effect (e.g. due to fringing fields) both at the front 102 and the back 104 of the conductor 101.

FIGS. 8a and 8b show further embodiments of coil structures 100. The structures 100 typically comprises three phase windings made up connected conductors 101 for connecting to a three phase input. The structure 100 of an electric motor may form a toroidal shape with the inner part 102 of conductors 101 near the air-gap. The outer part 104 of the conductors 101 on the outside of the stator form the return path of the conductors 101. The coil structure 100 comprises twelve conductors providing twelve coils (one for each stator slot) coupled together so as to provide the three phase windings.

In FIG. 8a and FIG. 8b, the parts 109 and 106 of conductors 101 at the top and bottom of the stator—also known as the end windings—are made of solid conductors 107 (i.e. a single sub-conductor). FIG. 8b shows the coil structure 100 including the top end winding (i.e. the top part 109 of the conductors 101) added and joined to the corresponding conductors 101 of the lower part. A motor incorporating this embodiment can be made very compact. In this embodiment, the parts 106 and 109 of conductors 101 on the top and bottom can be solid and the parts 102 of conductors 101 passing through the length of the motor incorporate a twisted sub-conductor arrangement.

Additionally, FIG. 8b illustrates an assembly method whereby the top conductors are bonded or soldered to the other conductors after the stator core is inserted into the lower and vertical conductors.

Figure 9:
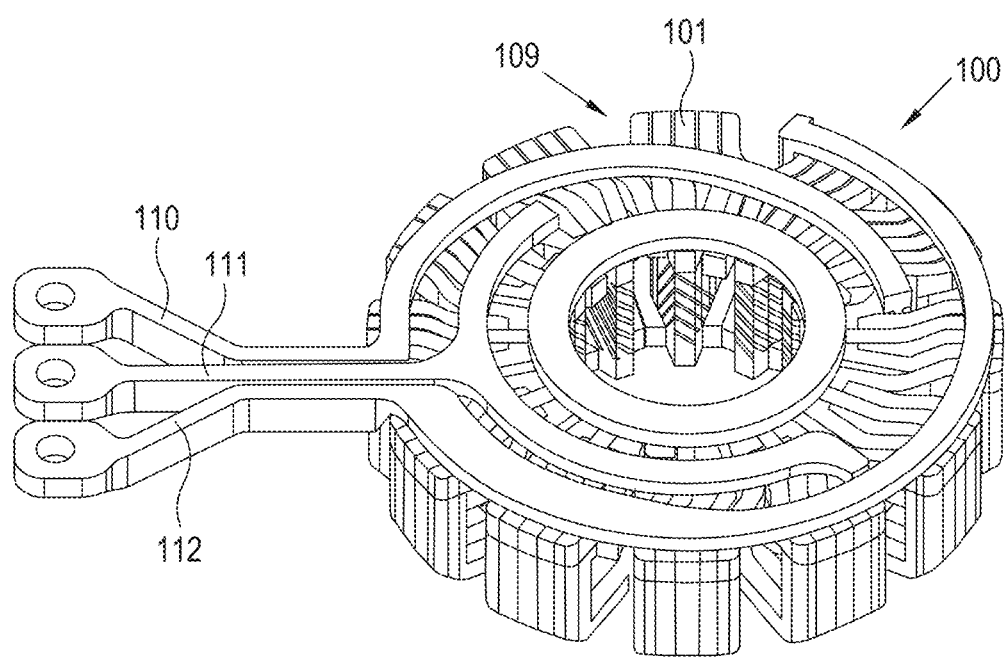
FIG. 9 shows another winding of an electric motor including three connectors for applying a voltage across the windings.

FIG. 9 shows a motor coil structure 100 with three connectors 110, 111 and 112 connected to the top part 109 of the conductors 101 for providing three phase input to the motor.

The design process used for the coil structure can offer significant manufacturing advantages. In one embodiment, the coil is manufactured as a solid U-shape structure, whereby the conductors are formed and insulated allowing for designs that previously would not be possible using conventional, intrusive copper wire winding techniques. The U-shaped structures are then mated with the top part of the conductors (or "end winding") using e.g. solder or welding. Also, by using additive manufacturing (e.g. 3D printing), the stator can be added midway through the printing process allowing for the coil structure to be printed completely around the stator. After the coils have been formed they are insulated, for example, by coating the conductors with a varnish.

These U-Shape conductors can be additively manufactured or, alternatively, a mould can be 3D printed and the unique design can be cast. Making the conductors in this manner allows for the design to be completely optimised in simulation and the exact number of conductors can be selected in balance against cross-sectional area of the conductor at each point within one turn and equally around the whole machine or magnetic component. Furthermore, the mould itself may be used as insulating material between sub-conductors and as such may be left in place after the casting.

Figure 10A:
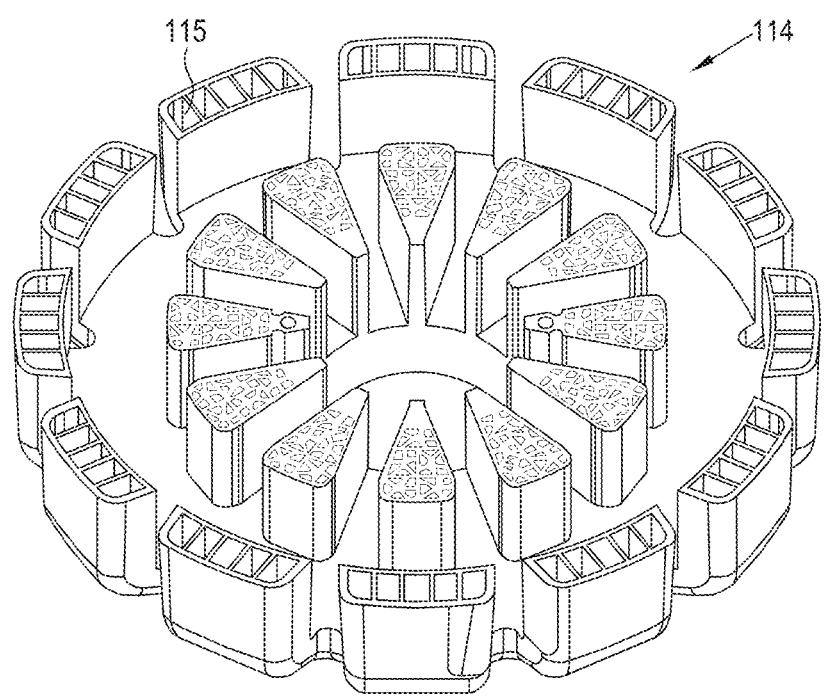
FIG. 10a shows a mould for casting a part of a coil winding according to an embodiment.
Figure 10B:
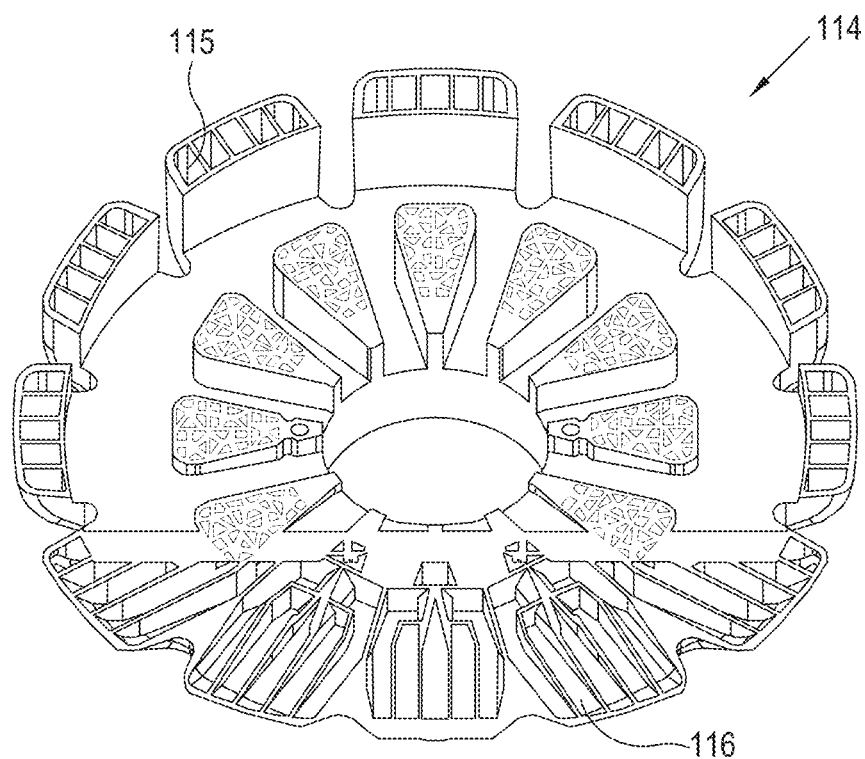
FIG. 10b shows a cross section of the mould.
Figure 10C:
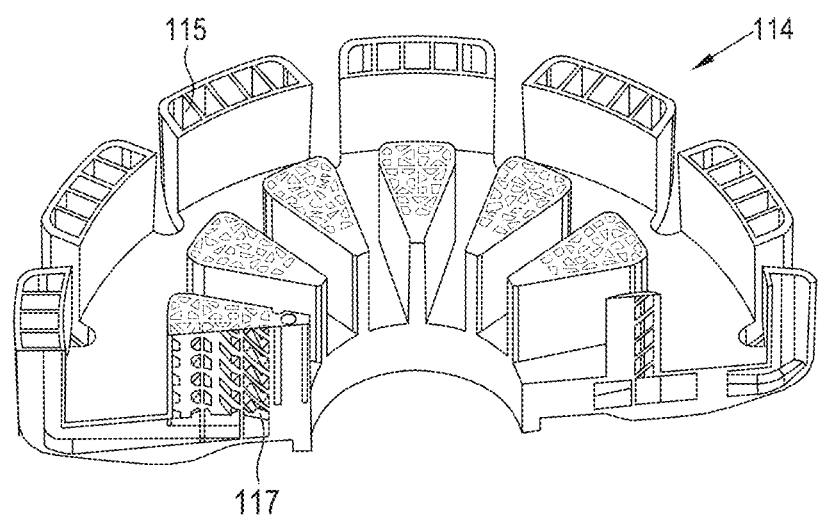
FIG. 10c shows another cross section of the mould.

FIGS. 10a to 10c show a mould 114 which may be used to cast a part of a coil structure according to an embodiment. FIG. 10a shows the mould 114, which may be used to cast the lower (U-shaped) part of the conductors of a coil structure for a toroidal stator. Hollows 115 (negative space) in the mould is filled with a suitable material (typically molten copper) to form the conductors. FIG. 10b shows the mould 114 with a partial cut-away to reveal ducts 116 for forming the bottom part of the conductors comprising solid conductors. FIG. 10c shows also shows the mould 114, but with a different cut-away to reveal ducts 117 for forming the twisted sub-conductors of the front part of the conductors. The mould 114 may be 3D printed, and may comprise ceramic or other material which is electrically insulating and thermally conductive. A similar mould may be used to cast the top part of the coil structure. The stator core may be inserted into the mould before casting the coil structures around it.

The manufacturing method described allows very compact coil structures to be produced in which the length of the copper turns is as short as possible to link the magnetic circuit. Furthermore the optimum use of the copper area to give the lowest possible resistance over the whole operating frequency range of the machine provides a method to make electrical motors and transformers which are efficient over a wide range of frequencies.

Embodiments of the coil structure may be advantageously formed using simultaneous additive manufacturing of the conductor part of a coil structure and the insulation between the individual conductors and sub-conductor of the coil structure. The insulation then provides the "fill" between parts of the conductive material (e.g. copper) and at the same time bonds the coil structure together without requiring additional support, which would in a single material process be made from the conductive material itself and which would then have to be cut away during post processing. For example, a two material 3D printing process may be used. The two materials can be built up simultaneously or one material at a time but alternating between each material as the build height increases.

The manufacturing process can be formed around the steel laminations. For example, a hollow housing can be printed first with an insulating material and then the copper windings (i.e. the conductors of the coil structure) start to be built up with continued insulating sections. With a coating of insulation over any exposed conductor, the steel lamination core can be inserted and then the printing can continue. The final result is a completed stator already in its housing.

FIGS. 6 to 10 have illustrated the construction of a motor with a toroidal winding scheme. The method can also be used for motor windings where the coil sides are placed in adjacent slots between stator teeth. In this case both coil sides will have some conductors near to the airgap which will benefit from sub-conductors. The end coils of the machine have less AC effects and could be solid conductors with a flat profile to have the lowest additional length to the length of the stator.

Examples according to the disclosure are preferably formed using an additive manufacturing process. A common example of additive manufacturing is 3D printing; however, other methods of additive manufacturing are available. Rapid prototyping or rapid manufacturing are also terms which may be used to describe additive manufacturing processes.

As used herein, "additive manufacturing" refers generally to manufacturing processes wherein successive layers of material(s) are provided on each other to "build-up" layer-by-layer or "additively fabricate", a three-dimensional component. This is compared to some subtractive manufacturing methods (such as milling or drilling), wherein material is successively removed to fabricate the part. The successive layers generally fuse together to form a monolithic component which may have a variety of integral sub-components. In particular, the manufacturing process may allow an example of the coil winding to be integrally formed and include a variety of features not possible when using prior manufacturing methods. In particular, a coil structure formed by additive manufacturing may take up less space than a winding formed by traditional wound copper wire for a given volume of conductive material. Using additive manufacturing can also provide sharper (substantially 90°) corners of the turns of the coil winding.

Additive manufacturing methods described herein enable manufacture to any suitable size and shape with various features which may not have been possible using prior manufacturing methods. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. In particular, this allows the formation of a conductor comprising both a part with multiple twisted sub-conductors and a part with a single solid conductor.

Suitable additive manufacturing techniques in accordance with the present disclosure include, for example, Fused Deposition Modeling (FDM), Selective Laser Sintering (SLS), Direct Selective Laser Sintering (DSLS), Electron Beam Sintering (EBS), Electron Beam Melting (EBM), Electron Beam Additive Manufacturing (EBAM), Laser Net Shape Manufacturing (LNSM), Direct Metal Deposition (DMD), Direct Selective Laser Melting (DSLM), Selective Laser Melting (SLM), Direct Metal Laser Melting (DMLM), Direct Metal Laser Sintering (DMLS), Material Jetting (MJ), Drop On Demand (DOD), Laminated Object Manufacturing (LOM) and other known processes. The additive manufacturing processes described herein may be used for forming components using any suitable material, but typically copper.

A single component to be formed from multiple materials. For example, a component may include multiple layers, segments, or parts that are formed using different materials, processes, and/or on different additive manufacturing machines. In this manner, components may be constructed which have different materials and material properties for meeting the demands of any particular application. In addition, additive manufacturing may be combined with other manufacturing techniques to provide the final product. For example, when forming a coil structure, a laminated core may be formed using conventional methods and then inserted into the coil structure after or during the additive manufacturing process.

Additive manufacturing processes typically fabricate components based on three-dimensional (3D) information, for example a three-dimensional computer model (or design file), of the component. Accordingly, examples described herein not only include products or components as described herein, but also methods of manufacturing such products or components via additive manufacturing and computer software, firmware or hardware for controlling the manufacture of such products via additive manufacturing.

The structure of one or more parts of the product may be represented digitally in the form of a design file. A design file, or computer aided design (CAD) file, is a configuration file that encodes one or more of the surface or volumetric configuration of the shape of the product. That is, a design file represents the geometrical arrangement or shape of the product.

Design files can take any now known or later developed file format. For example, design files may be in the Stereolithography or "Standard Tessellation Language" (.stl) format which was created for stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any three-dimensional object to be fabricated on any additive manufacturing printer.

Further examples of design file formats include AutoCAD (.dwg) files, Blender (.blend) files, Parasolid (.x_t) files, 3D Manufacturing Format (.3mf) files, Autodesk (3ds) files, Collada (.dae) files and Wavefront (.obj) files, although many other file formats exist.

Design files can be produced using modelling (e.g. CAD modelling) software and/or through scanning the surface of a product to measure the surface configuration of the product.

Once obtained, a design file may be converted into a set of computer executable instructions that, once executed by a processor, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of suitable additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the product using any of the technologies or methods disclosed herein.

Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the product that can be used to physically generate the object, upon execution of the code or instructions by an additive manufacturing system. For example, the instructions may include a precisely defined 3D model of the product and can be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component.

Accordingly, by controlling an additive manufacturing apparatus according to the computer executable instructions, the additive manufacturing apparatus can be instructed to print out one or more parts of the product. These can be printed either in assembled or unassembled form. For instance, different sections of the product may be printed separately (as a kit of unassembled parts) and then subsequently assembled. This may be particularly suitable for embodiments of the coil structure. The U-shaped lower part and the flat top part of the conductor can then be formed separately and then fixed together. Alternatively, the different parts may be printed in assembled form.

In light of the above, embodiments include methods of manufacture via additive manufacturing. This includes the steps of obtaining a design file representing the product and instructing an additive manufacturing apparatus to manufacture the product in assembled or unassembled form according to the design file. The additive manufacturing apparatus may include a processor that is configured to automatically convert the design file into computer executable instructions for controlling the manufacture of the product. In these embodiments, the design file itself can automatically cause the production of the product once input into the additive manufacturing device. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing device.

Given the above, the design and manufacture of implementations of the subject matter and the operations described in this specification can be realized using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

Whilst specific embodiments have been described above, the skilled person will understand that other embodiments may be provided within the scope of the claims.

The invention claimed is:

1. An electric motor comprising:
   a stator comprising a first magnetic core and a coil structure; and
   a rotor configured to rotate about an axis, the rotor comprising a second magnetic core,
   wherein there is an airgap between the first and second magnetic cores,
   wherein the coil structure comprises a conductor configured to provide a coil comprising one or more coil turns around the first magnetic core to induce a magnetic flux in the first magnetic core when in use, the conductor comprising:
      one or more first parts comprising a plurality of sub-conductors in parallel; and
      one or more second parts coupled in series with the first part(s), wherein the or each second part comprises a single sub-conductor or a lesser number of sub-conductors in parallel, wherein at least one coil turn comprises a first part of the one or more first parts and a second part of the one or more second parts and a transition between the first and second parts occurs substantially at both axially outer ends of the first magnetic core, and wherein the or each coil turn is arranged around the magnetic core of the stator so that the or each first part of the conductor is located in a stator slot of the stator and closer to the airgap than at least one of the second parts of the conductor.

2. An electric motor according to claim 1, wherein the plurality of sub-conductors of the or each first part comprises a number of sub-conductors in a range of 2 to 10.

3. An electric motor according to claim 1, wherein the sub-conductors of the or each first part are twisted around one another.

4. An electric motor according to claim 3, wherein the plurality of sub-conductors of the or each first part are twisted to provide one or more full rotations of each sub-conductor.

5. An electric motor according to claim 1, said conductor being configured to couple the first and second parts by means of a single sub-conductor.

6. An electric motor according to claim 1 and comprising a plurality of said conductors to provide a corresponding plurality of coils.

7. An electric motor according to claim 6, wherein said plurality of coils are configured to provide a plurality of phase windings.

8. An electric motor according to claim 7, wherein, for the or each coil turn, the first part is located in a slot of the stator adjacent to the airgap and the second part provides a return path outside the slot.

9. An electric motor according to claim 1, wherein, for the or each coil, the conductor is arranged so that in use the or each first part of the conductor experiences a greater magnetic field than the or each second part when the electric motor is in use.

10. A method of forming a coil structure according to claim 1, the method comprising:
    forming the or each conductor by additive manufacturing; and
    forming an insulating structure between parts of the or each conductor and its sub-conductors, wherein the insulating structure provides support for the or each conductor during the additive manufacturing.

11. A method according to claim 10, wherein the or each conductor and the insulating structure are formed by a two material 3D printing process.

12. A method according to claim 10 and comprising inserting the magnetic core into the coil structure during the formation of the conductor(s).

13. A computer readable storage medium storing a design file representing a geometrical arrangement or shape of the coil structure of claim 1.

14. A computer program comprising computer executable instructions that, when executed by a processor, cause the processor to control an additive manufacturing apparatus to manufacture the coil structure of claim 1.

15. A method of manufacturing a coil structure via additive manufacturing, the method comprising:
    obtaining an electronic file representing a geometry of a coil structure according to claim 1; and
    controlling an additive manufacturing apparatus to manufacture, over one or more additive manufacturing steps, the coil structure according to the geometry specified in the electronic file.

16. A method of forming a coil structure for an electric motor and comprising one or more coils, the method comprising:
    forming a substantially U-shaped part by additive manufacturing;
    inserting a magnetic core in the substantially U-shaped part;
    forming a top part; and
    fixing the top part to the substantially U-shaped part to provide, for the or each coil, a continuous conductor providing one or more coil turns around the magnetic core;
    wherein the coil structure is for a stator of the electric motor having a rotor configured to rotate about an axis, the coil structure comprising a conductor configured to provide a coil comprising one or more coil turns around a magnetic core of the stator to induce a magnetic flux in the magnetic core when in use, the conductor comprising:
       one or more first parts comprising a plurality of sub-conductors in parallel; and
       one or more second parts coupled in series with the first part(s), wherein the or each second part comprises a single sub-conductor or a lesser number of sub-conductors in parallel, and wherein at least one coil turn comprises a first part of the one or more first parts and a second part of the one or more second parts and a transition between the first and second parts occurs substantially at both axially outer ends of the magnetic core.

17. A method according to claim 16, wherein said step of fixing comprises bonding, welding or soldering.

* * * * *